Aug. 11, 1964  G. L. JACOBS  3,144,003
ANIMAL WATERING FOUNTAIN
Filed May 31, 1963  2 Sheets-Sheet 1
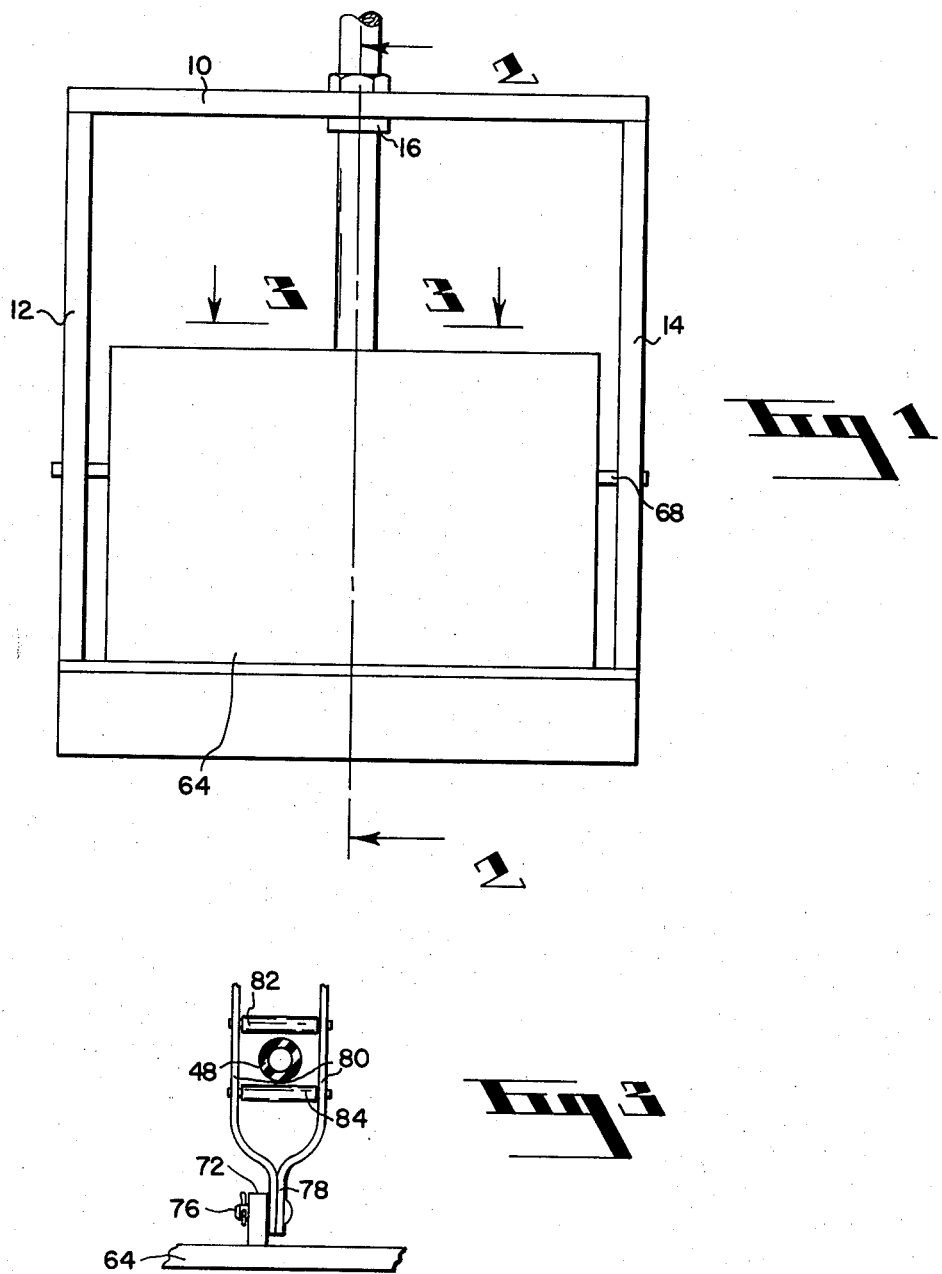
INVENTOR.
GORDON L. JACOBS
BY

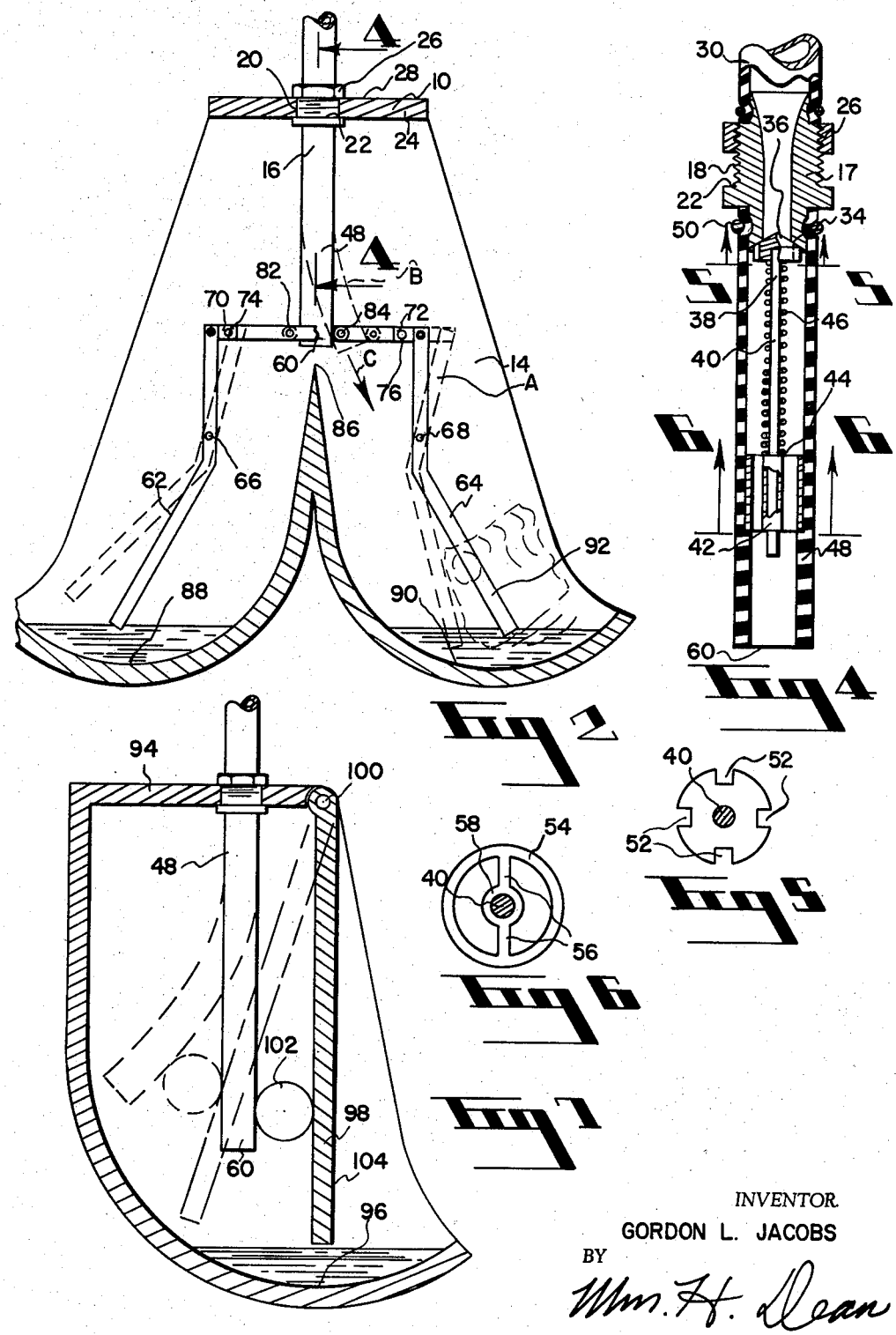

United States Patent Office 3,144,003
Patented Aug. 11, 1964

3,144,003
ANIMAL WATERING FOUNTAIN
Gordon L. Jacobs, Box 51, Cochise, Ariz.
Filed May 31, 1963, Ser. No. 284,678
6 Claims. (Cl. 119—75)

This invention relates to an animal watering fountain and more particularly to an animal watering fountain which may be operated by animals such as hogs, cattle, or other livestock as desired.

Various animal watering fountains have been known to those skilled in the prior art and some of these have been operable by animals, however, such prior art devices have been relatively expensive and complicated inasmuch as many of them have required the use of expensive valves and in many instances a plurality of valves have been used in an animal watering fountain, thus rendering such mechanisms expensive and complicated.

Accordingly, it is an object of the present invention to provide an animal watering fountain which may be operable by an animal and which employs very simple valve and valve operating mechanism.

Another object of the invention is to provide a novel animal watering fountain wherein a pair of receptacles are supplied water by a single valve which is alternately opened and concurrently switched from one fountain to another automatically depending upon the actuation of a nose engaging member in a respective one of the fountains by an animal.

Another object of the invention is to provide a novel animal watering fountain having very simple mechanism which is economical to produce and which is very reliable and durable in operation.

Another object of the invention is to provide an animal watering fountain employing a novel valve and nose engaging actuator mechanism which renders the fountain very reliable and initially economical to produce.

Further objects and advantages of the invention may be apparent from the following specification, appended claims and the accompanying drawings in which FIG. 1 is a side elevational view of an animal watering fountain in accordance with the present invention;

FIG. 2 is an enlarged fragmentary sectional view thereof taken from the line 2—2 of FIG. 1; FIG. 3 is an enlarged fragmentary planned sectional view taken from the line 3—3 of FIG. 1 showing valve actuating mechanism coupled to an animal nose engaging member;

FIG. 4 is an enlarged fragmentary sectional view of the valve mechanism of the animal watering fountain of the invention taken from the line 4—4 of FIG. 2;

FIG. 5 is an enlarged sectional view taken from the line 5—5 of FIG. 4 showing the body of the valve mechanism of the invention omitted;

FIG. 6 is a sectional view taken from the line 6—6 of FIG. 4 showing the body of the valve omitted; and FIG. 7 is a sectional view similar to FIG. 2 but showing a modification of the present invention wherein only one drinking receptacle is provided.

As shown in FIG. 1 of the drawings the frame of the animal watering fountain of the invention comprises a top member 10 having downwardly extending side members 12 and 14 fixed thereto. Mounted in the top 10 is a resilient valve body 16.

This valve body 16 as shown on FIG. 4 of the drawings is provided with a rigid structural fitting 17 of hollow tubular configuration having an externally screw threaded portion 18 mounted in an opening 20 in the top plate 10. A shoulder 22 of the fixture 17 abuts a lower side 24 of the top plate 10 while a jam nut 26 screw threaded on the screw threaded portion 18 engages the top or upper surface 28 of the top member 10. A water supply conduit 30 is secured to the fixture 17 for delivering water into a bore portion 32 of the fixture 17 and at the lower end of this bore portion 32 is a valve seat 34 engaged by a head 36 of a poppet valve 38. This poppet valve 38 is provided with a stem 40 fixed to the head 36 and a bushing 42 guides the stem 40 and forms a support for one end 44 of a spring 46 having its other end engaging the head 36 to urge it into intimate contact with the valve seat 34.

The guide 42 is mounted in a resilient tubular valve body 48 which is fixed to the fixture 17 by means of a clamp ring 50.

It will be appreciated that when the valve body 48 is pivoted laterally it causes the stem 40 of the valve to be moved laterally by means of the guide 42 and thus the head 36 of the valve is axially tilted with respect to the seat 34 permitting water to bypass the valve head through notches 52 therein as shown in FIG. 5 of the drawings.

The guide 42 is provided with an external sleeve portion 54 secured inside the resilient valve body 48 and a pair of webs 56 hold a central guide bushing 58 to guide the valve stem 40 centrally of the valve body 48. Thus water passing from the bore 32 and around the head 36 through the notches 52 may pass around the webs 56 and outwardly and downwardly through a downwardly directed open end 60 of valve body 48.

Plate members 62 and 64 are pivotally mounted between the plates 12 and 14 by means of pins 66 and 68 respectively. These pins 66 and 68 project through the sides 12 and 14 thereby forming pivotal mountings for the plates 62 and 64.

Upper ends of the plates 62 and 64 are provided with tabs 70 and 72 respectively through which pins 74 and 76 extend. These pins also extend through a yoke member 78 having bifurcated portions 80 between which bars 82 and 84 are mounted. These bars 82 and 84 are disposed to engage opposite sides of the valve body 48 and thus move it alternately back and forth at opposite sides of a partition 86 as will be hereinafter described.

The sides 12 and 14 of the frame are connected to receptacle portions 88 and 90 at opposite sides of the partition 86 and the nose engaging members 62 and 64 are pivotally mounted above the respective receptacles 88 and 90.

When an animal's nose engages a portion 92 of the member 64 it is pivoted to a broken line position A about the axis of the pin 86 which forces the bars 82 and 84 to carry the valve body 48 to a broken line position B thereby moving its downwardly directed open end 60 to one side of the partition 86 and toward the receptacle 90 so that water is delivered thereto as indicated by the arrow C, and thus an animal having his nose engaged with the member 92 receives water in the receptacle 90 for his own drinking purposes.

Actuation of the nose engaging member 62 in a similar manner will force the valve body 48 to be deflected by the bars 82 and 84 to the opposite side of the partition 86 and to thereby deliver water to the receptacle 88.

It will be appreciated by those skilled in the art that the single deflectable valve 16 is coupled by means of the yoke 78 acting as linkage to pivot the valve alternately to deliver water to either of the receptacles 88 and 90 and concurrently to permit water to flow therethrough due to the fact that deflection of the valve body 48 causes the valve 36 to be opened relative to the seat 34 as hereinbefore described. The linkage of the yoke 78 into connecting the upper ends of the nose engaging members 62 and 64 provides a very simple means for alternately directing water from the valve body 48 to a respective receptacle 88 or 90 depending upon which receptacle is approached by the animal desiring a drink.

In the modification as shown in FIG. 7 of the drawings a single frame is provided and this frame is equipped with a top 94 on which the valve 48 is mounted in a similar manner to that shown in FIGURES 2 and 4 of the drawings. The lower open end of the valve body 48 is disposed to deliver water into a receptacle 96 and a nose engaging plate 98 is pivotally mounted at 100 above a bar 102 fixed to the plate and engageable with the valve body 60. In operation the modification shown in FIG. 7 of the drawings merely includes the pressure of an animal's nose on a surface 104 of the plate 98 whereupon the member 102 is pressed backwardly and thus deflects the valve body 48 until the valve 36 is off of seat 34 resulting in the delivery of water from the open end 60 of the valve body 48 into the receptacle 96 wherein the animal may drink.

It will be obvious to those skilled in the art that various modifications of the present invention may be resorted to in a manner limited only by a just interpretation of the following claims.

I claim:

1. In an animal drinking fountain the combination of: a frame; a water receiving receptacle thereon; a member pivoted on said frame above said receptacle and adapted to be engaged by the nose of an animal when said animal is drinking from said receptacle; an elongated hollow resilient valve body supported on said frame and disposed to be deflected by said member when pivoted relative to said frame; a substantially rigid elongated valve actuating member in said valve body; a poppet valve member in said valve body disposed to be axially tilted and opened by said elongated actuating member during deflection of said valve body; the length of said actuating member being a multiple of the diameter of said poppet valve; and an open delivery end of said hollow valve body directed toward said receptacle.

2. In an animal drinking fountain the combination of: a frame; a water receiving receptacle thereon; a member pivoted on said frame above said receptacle and adapted to be engaged by the nose of an animal when said animal is drinking from said receptacle; an elongated hollow resilient valve body supported on said frame and disposed to be deflected by said member when pivoted relative to said frame; a substantially rigid elongated valve actuating member in said valve body; a poppet valve member in said valve body disposed to be axially tilted and opened by said elongated actuating member during deflection of said valve body; the length of said actuating member being a multiple of the diameter of said poppet valve; and an open delivery end of said hollow valve body directed toward said receptacle; said frame having a top; space members extending downwardly therefrom; lower portions of said spaced members supporting said receptacle; said spaced members pivotally supporting said first mentioned member.

3. In an animal drinking fountain the combination of: a frame; a water receiving receptacle thereon; a member pivoted on said frame above said receptacle and adapted to be engaged by the nose of an animal when said animal is drinking from said receptacle; an elongated hollow resilient valve body supported on said frame and disposed to be deflected by said member when pivoted relative to said frame; a substantially rigid elongated valve actuating member in said valve body; a poppet valve member in said valve body disposed to be axially tilted and opened by said elongated actuating member during deflection of said valve body; the length of said actuating member being a multiple of the diameter of said poppet valve; and an open delivery end of said hollow valve body directed toward said receptacle; said frame having a top; space members extending downwardly therefrom; lower portions of said spaced members supporting said receptacle; said spaced members pivotally supporting said first mentioned member; said resilient valve body connected to said top and extending downwardly therefrom.

4. In an animal drinking fountain the combination of: a frame; a water receiving receptacle thereon; a member pivoted on said frame above said receptacle and adapted to be engaged by the nose of an animal when said animal is drinking from said receptacle; an elongated hollow resilient valve body supported on said frame and disposed to be deflected by said member when pivoted relative to said frame; a substantially rigid elongated valve actuating member in said valve body; a poppet valve member in said valve body disposed to be axially tilted and opened by said elongated actuating member during deflection of said valve body; the length of said actuating member being a multiple of the diameter of said poppet valve; and an open delivery end of said hollow valve body directed toward said receptacle; said frame having a top vertically spaced above said receptacle, said valve mounted on said top and having its open end directed downwardly, said first mentioned member pivoted on a horizontal axis; and means carried by said first mentioned member and engaging said valve body below said horizontal axis.

5. In an animal drinking fountain the combination of: a frame; a pair of water receiving receptacles thereon; a pair of members pivoted on said frame above said respective pair of receptacles and each member adapted to be engaged by the nose of an animal when said animal is drinking from a respective one of said receptacles; an elongated hollow resilient valve body disposed to be deflected by either of said members when pivoted relative to said frame; a substantially rigid elongated valve actuating member in said valve body; a poppe tvalve member in said valve body disposed to be axially tilted and opened by said elongated actuating member during deflection of said valve body; the length of said actuating member being a multiple of the diameter of said poppet valve; an open delivery end of said hollow valve body directed downward toward said receptacle; a partition between said receptacles; said open end directed normally over said partition; and link means pivotally connected to said first mentioned members and engageable with said valve body for pivoting said open end thereof to a position at a respective side of said partition to deliver water to a respective one of said receptacles over which a respective one of said members is engaged by the nose of an animal.

6. In an animal drinking fountain the combination of: a frame; a pair of water receiving receptacles thereon; a pair of members pivoted on said frame above said respective pair of receptacles, each of said members adapted to be engaged by the nose of an animal when said animal is drinking from a respective one of said receptacles; a movable hollow water delivery conduit disposed to be deflected by said members when pivoted relative to said frame; a valve member mounted for bendable actuation communicating with the interior of said delivery conduit and disposed to be opened by said deflection of said hollow delivery conduit; an open delivery end of said hollow water delivery conduit directed toward said receptacle; a partition between said receptacles; said open end directed normally over said partition; and link means pivotally connected to said member and engageable with said hollow delivery conduit for pivoting said open end thereof to a position at a respective side of said partition to delivery water to a respective one of said receptacles over which a respective one of said members is engaged by the nose of an animal; said members pivotally interconnected by said link means.

References Cited in the file of this patent

UNITED STATES PATENTS

| | | |
|---|---|---|
| 1,082,287 | Schaffer et al. | Dec. 23, 1913 |
| 1,418,592 | McGee | June 6, 1922 |
| 1,640,649 | Dickow | Aug. 30, 1927 |
| 1,674,811 | Turner | June 26, 1928 |
| 2,157,881 | Andreasen | May 9, 1939 |
| 2,625,952 | Eide et al. | Jan. 20, 1953 |
| 2,785,016 | Vollertzen et al. | Mar. 12, 1957 |
| 2,799,471 | Maroney | July 16, 1957 |